United States Patent [19]
Paniccia, Jr.

[11] Patent Number: 5,524,046
[45] Date of Patent: *Jun. 4, 1996

[54] TWO-HANDSET CORDLESS TELEPHONE SYSTEM

[75] Inventor: Samuel R. Paniccia, Jr., Liverpool, N.Y.

[73] Assignee: Thomson Consumer Electronics, Inc., Indianapolis, Ind.

[*] Notice: The term of this patent shall not extend beyond the expiration date of Pat. No. 5,392,330.

[21] Appl. No.: 465,041

[22] Filed: Jun. 6, 1995

Related U.S. Application Data

[63] Continuation of Ser. No. 353,586, Dec. 8, 1994, abandoned, which is a continuation of Ser. No. 817,934, Jan. 8, 1992, abandoned.

[51] Int. Cl.[6] .................................................. H04M 11/00
[52] U.S. Cl. ............................. 379/61; 379/58; 455/315
[58] Field of Search ................................. 379/58, 61, 63; 455/54.1, 313, 314, 315, 316, 324, 207, 209, 303, 306

[56] References Cited

U.S. PATENT DOCUMENTS

| | | | |
|---|---|---|---|
| 4,476,575 | 10/1984 | Franke et al. | |
| 4,864,599 | 9/1989 | Saegusa et al. | 379/61 |
| 4,875,231 | 10/1989 | Hara et al. | 379/61 |
| 5,133,002 | 7/1992 | Kikuchi et al. | 379/58 |

FOREIGN PATENT DOCUMENTS

| | | |
|---|---|---|
| 0203819 | 12/1986 | European Pat. Off. . |
| 0304998 | 3/1989 | European Pat. Off. . |
| 0305604 | 3/1989 | European Pat. Off. . |
| 0316839 | 5/1989 | European Pat. Off. . |
| 0342707 | 11/1989 | European Pat. Off. . |
| 3738829 | 5/1989 | Germany . |
| 8606915 | 11/1986 | WIPO . |

OTHER PUBLICATIONS

Data Sheet for the DPX 46/49 duplexer by Soshin Electric Ltd. Feb. 1994.

Primary Examiner—Curtis Kuntz
Assistant Examiner—G. J. Oehling
Attorney, Agent, or Firm—Joseph S. Tripoli; Peter M. Emanuel; Thomas F. Lenihan

[57] ABSTRACT

It is desirable that a cordless telephone system include a single base unit and at least two remote handunits. With such a system, two users may maintain participation in a three-way conversation while being free to move about within reasonable transmitting distance to and from the base unit. Circuitry is provided in which a signal received from one handunit is transmitted to the other handunit, and sidetone from one handunit is transmitted back to that handunit.

4 Claims, 3 Drawing Sheets

TWO-HANDSET CORDLESS TELEPHONE SYSTEM

This is a continuation of application Ser. No. 08/353,586, filed Dec. 12, 1994, now abandoned, which is a continuation of application Ser. No. 07/817,934, filed Jan. 8, 1992, now abandoned.

FIELD OF THE INVENTION

This invention concerns the field of cordless instruments.

CROSS REFERENCE TO RELATED APPLICATION

This application is related to applications bearing U.S. patent application Ser. Nos. 817,932 (now U.S. Pat. No. 5,392,330) and 08/397,680 filed herewith.

BACKGROUND OF THE INVENTION

Cordless telephone instruments for use in the home are widely available. Such systems, comprise a base unit and a remote handunit. The base unit is coupled to the telephone line and communicates with the remote handunit via FM radio signals. With such a cordless telephone system a user can remove the handunit from its cradle and carry it with him a short distance from his house yet still be able to make and receive telephone calls. Such a cordless telephone set is known from GE cordless telephone model number 2-9675 manufactured by Thomson Consumer Electronics, Inc. Indianapolis, Ind.

If the user is engaged in a conversation via a cordless telephone, and a third person within the user's house wishes to join in the telephone conversation, that person can simply pick up a "hard-wired" extension telephone. Unfortunately, the third person cannot maintain participation in the conversation without remaining in the immediate area of the hard-wired telephone unit.

SUMMARY OF THE INVENTION

It is herein recognized that it is desirable that a cordless telephone system include a single base unit and at least two remote handunits. With such a system, two users may maintain participation in a three-way conversation while being free to move about within a reasonable transmission distance from the base unit. In the apparatus according to the invention, the signal received from one handunit is transmitted to the other handunit, and sidetone from one handunit is transmitted back to that handunit.

DETAILED DESCRIPTION OF THE DRAWING

Figure 1:
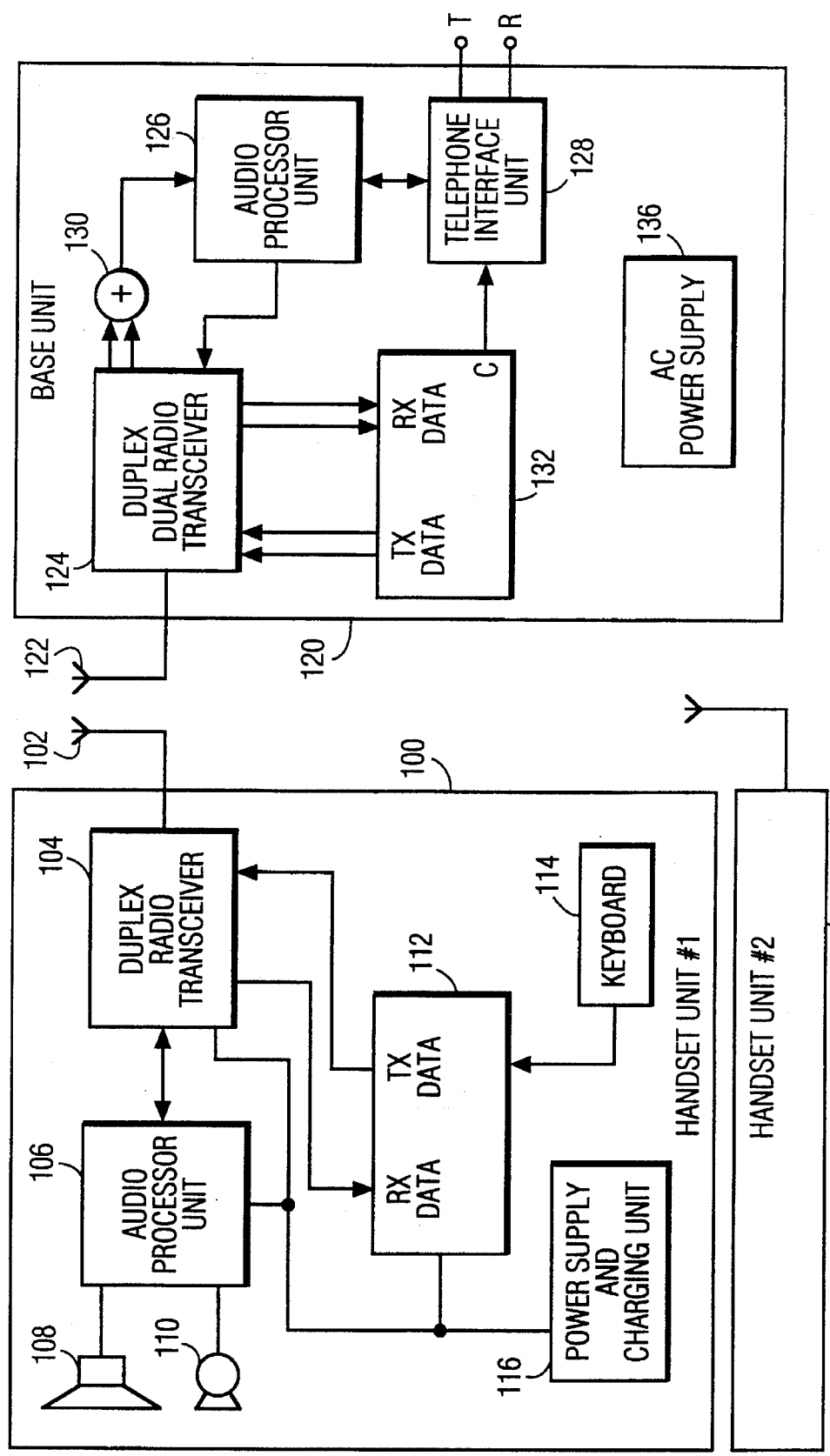
FIG. 1 is a block diagram of a cordless telephone system according to the subject invention.

FIG. 1 is a simplified illustration of a cordless telephone set comprising a first handset unit 100, a second handset unit 150, and a base unit 120. Because handset units 100 and 150 are identical (except for frequency allocation), only handset 100 will be described. Handset unit 100 receives and transmits RF signals via an antenna 102. Antenna 102 is coupled to a duplex radio transceiver unit 104 which is capable of operation in a receiver mode and in a transmitter mode. In the receiver mode, transceiver unit 104 applies received and demodulated audio signals to an audio processor unit 106 for amplification and ultimate reproduction in speaker 108. Also in the receiver mode, transceiver 104 also provides digital data to the "receive data" (i.e., Rxdata) terminal of controller 112. In the transmitter mode, transceiver 104 receives audio signals, picked-up (i.e., detected) by microphone 110 and amplified by audio processor unit 106, for transmission to base unit 120. Also in transmitter mode, transceiver 104 receives "transmit data" (i.e., Txdata) from controller 112, for transmission to base unit 120. Controller 112 is coupled to a keyboard 114 for receiving keystroke commands from a user. Handunit 100 also includes a power supply and charging unit 116 for supplying operating power to the circuitry of the handunit.

Base unit 120 receives and transmits RF signals via an antenna 122 to remote handunits 100 and 150. Antenna 122 is coupled to a duplex dual radio transceiver unit 124 which is capable of operation in a receiver mode and in a transmitter mode. In the receiver mode, transceiver unit 124 receives RF signals at two different frequencies from remote handunits 100 and 150 respectively, and applies received and demodulated audio signals to an audio processor unit 126 for amplification and coupling to the telephone system via a telephone interface unit 128. Telephone interface unit 128 is connected to the telephone system via two terminals traditionally known as tip (T) and ring (R). Also in the receiver mode, transceiver 124 also provides digital data to the "receive data" (i.e., Rxdata) terminal of controller 132. Controller 132 has a control terminal C by which telephone interface unit 128 can be controlled to establish communication over the telephone system. In the transmitter I 5 mode, transceiver 124 receives audio signals, conveyed by the telephone system via telephone interface unit 128 and amplified by audio processor unit 126, for transmission to handunits 100 and 150. Also in transmitter mode, transceiver 124 receives "transmit data" (i.e., Txdata) from controller 132, for transmission to handunit 100. Base unit 120 also includes an AC power supply unit 136 for supplying operating power to the circuitry of the base unit.

Figure 2:
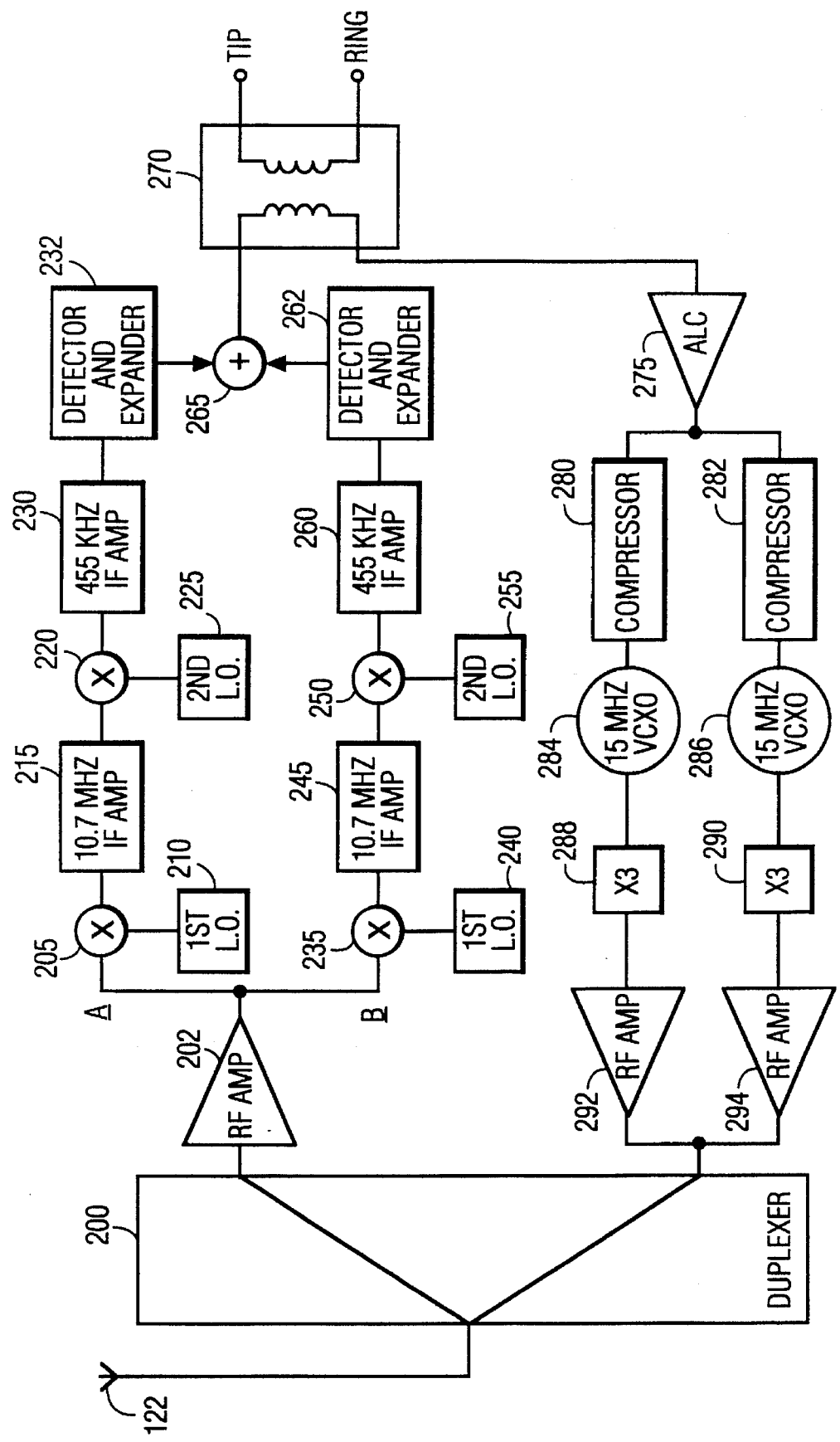
FIG. 2 is a more detailed block diagram of the base unit of FIG. 1.

FIG. 2 is a more detailed block diagram of duplex dual radio transceiver 124 of FIG. 1. Antenna 122 is coupled to an RF amplifier 202 via a duplexer 200, which may be a type DPX 46/49-B10 duplexer manufactured by Soshin Electric Ltd. Handsets 100 and 150 transmit on different frequencies near 49 MHz. The signals received from the handunits are applied to mixers 205 and 235. Mixer 205 has a second input coupled to a local oscillator 210 for receiving an oscillator signal near 39 MHz. That is local oscillator 210 is tuned to oscillate at the difference frequency between the transmission frequency of one of the remote handunits and the first intermediate (IF) frequency of 10.7 MHz of receiver channel A. Similarly, local oscillator 240 is tuned to oscillate at the difference between the transmission frequency of the other of the two remote handunits and the first IF frequency of 10.7 MHz of receiver channel B.

The down-converted 10.7 MHz signals of channels A and B are applied to mixers 220 and 250, respectively. Each of mixers 220 and 250 is coupled to a second local oscillator 225 and 255, respectively. Thus, the received signals of channels A and B are further down-converted to a final IF frequency of 455 kHz, and applied to respective IF amplifiers 230 and 260. After amplification the signals are detected and expanded in detector and expander units 232 and 262 to produce baseband audio signals. The baseband audio signals are then summed in a summer unit 265 and coupled to the telephone line via a hybrid transformer unit 270.

For purposes of explanation, assume that handset A transmits the signal processed in receiver channel A and handset B transmits the signal processed in receiver channel B. An A+B sidetone signal (i.e., a portion of the received signals from both channels) is coupled from hybrid transformer unit 270 via an automatic level control unit 275 to the transmitter side of the transceiver for transmission to the handunits. In this way, the sidetone signal corresponding to signals received from handset A is coupled back to handset A, and the signal received from handset A is also transmitted to handset B for A-to-B communication. Further, the sidetone signal corresponding to signals received from handset B is coupled back to handset B and the signal received from handset B is also transmitted to handset A for B-to-A communication.

The signal from automatic level control unit 275 is applied to the inputs of two compressor units 280 and 282. The compressed audio signals are applied to control inputs of separate oscillators 284 and 286 to modulate their respective output signals. Oscillators 284 and 286 oscillate at different frequencies near 15 MHz. The modulated signals are then applied to respective frequency triplets 288 and 290 to bring their final frequencies to different frequencies near 46 MHz. The signals are amplified in amplifiers 292 and 294, are combined, and applied via duplexer 200 to antenna 122.

Figure 3:
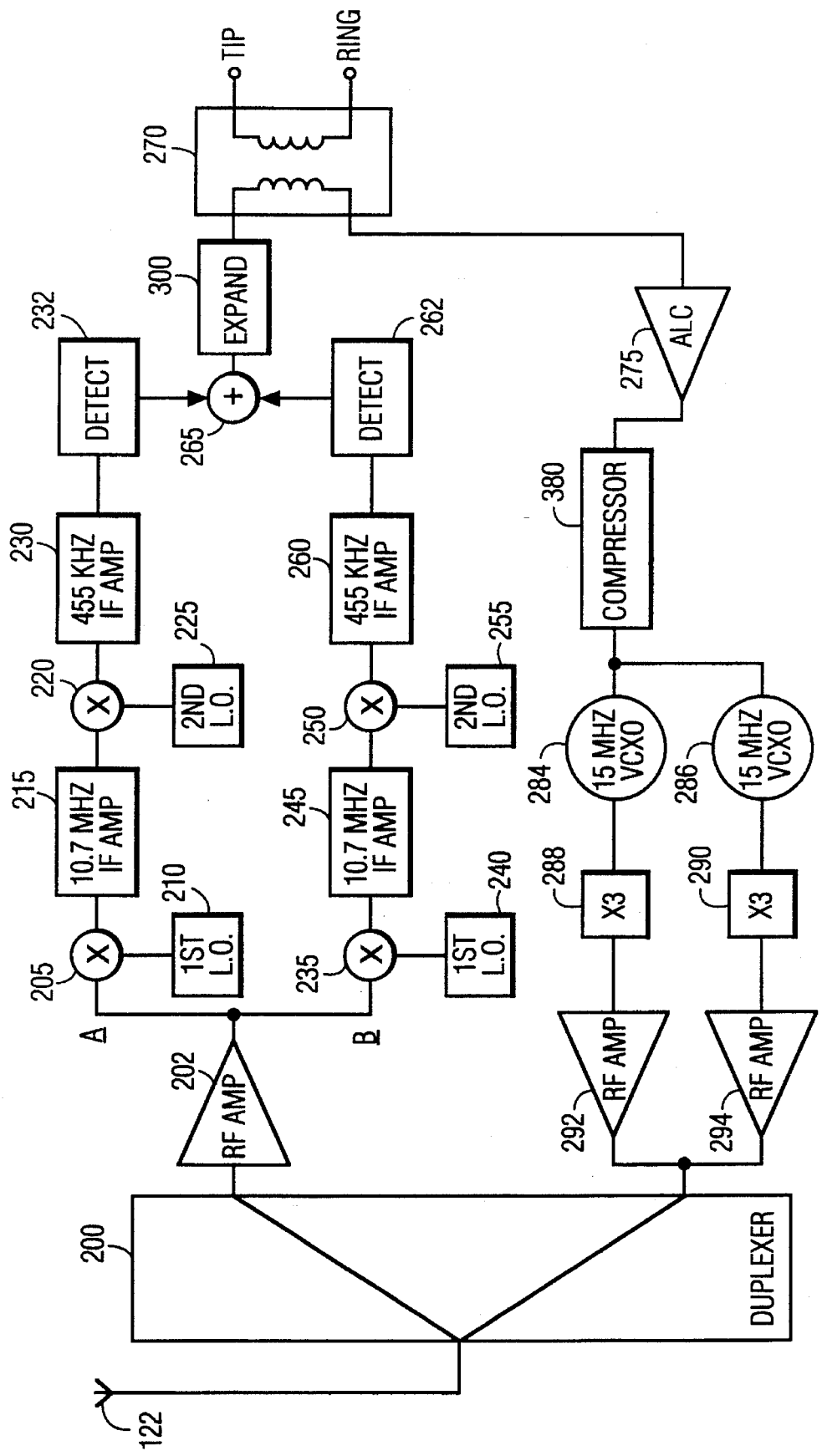
FIG. 3 is an alternative embodiment to the arrangement of FIG. 2.

FIG. 3 shows an embodiment of the invention in which only a single expander and compressor are used. This arrangement recognizes that the output of expander 300 will not be exactly A+B, but that the signal A+B only occurs when both handset operators are speaking simultaneously. In normal conversation simultaneous speech does not usually occur, rather, the users of handsets A and B alternate speaking and listening. Thus, it is herein recognized that the expander can be time-shared with little noticeable degradation of performance.

What is claimed is:

1. A cordless telephone set, comprising:

a first handunit for producing a first audio signal;

a second handunit for producing a second audio signal; and a base unit for simultaneously receiving signals of said handunits, and coupling said signals of said handunits to a telephone system;

said base unit including means for combining said received signals of said handunits to form a single output signal for transmission via said telephone system;

said handunits and said base unit communicating via a single antenna mounted on said base unit;

said first handunit transmitting said first audio signal on a first frequency and receiving on a second frequency;

said second handunit transmitting said second audio signal on a third frequency and receiving on a fourth frequency, said first and third frequencies being near a nominal handunit transmitting frequency, said second and fourth frequencies being near a nominal handunit receiving frequency;

said base unit including a duplexing unit for coupling said audio signals at said first and third frequencies from said antenna to first and second base unit receiver channels, and for coupling said audio signals at said second and fourth frequencies from first and second base unit transmitter channels to said antenna, said duplexing unit being tuned to pass signals at said nominal handunit transmitting frequency and at said nominal handunit receiving frequency;

wherein to provide for a three-way conversation, said first audio signal received from said first handunit is transmitted by said base unit to said second handunit, and said second audio signal received from said second handunit is transmitted by said base unit to said first handunit; and wherein said base unit transmits to said first handunit a portion of said signal received from said first handunit as a sidetone signal, and in addition transmits to said first handunit a portion of said signal received from said second handunit.

2. The cordless telephone set of claim 1 wherein, said first and second receiving channels being double conversion tuning circuits each including first and second mixer stages and first and second local oscillators;

each of said double conversion tuning circuits having a first intermediate frequency amplifier tuned to 10.7 MHz, and a second intermediate frequency amplifier tuned to 455 kHz.

3. The cordless telephone set of claim 2 wherein, each of said first and second transmitting channels includes a voltage controlled oscillator for producing a respective RF signal modulated in frequency by an audio signal and a frequency tripler circuit for producing a higher frequency RF signal for transmission, said higher frequency RF signals being signals at said second and fourth frequencies, respectively.

4. The cordless telephone set of claim 1 wherein, said combining means is a summing circuit.

* * * * *